Aug. 3, 1965    C. J. STALEGO    3,198,615
METHOD AND APPARATUS FOR MELTING HEAT-SOFTENABLE MATERIALS
Filed Aug. 11, 1961
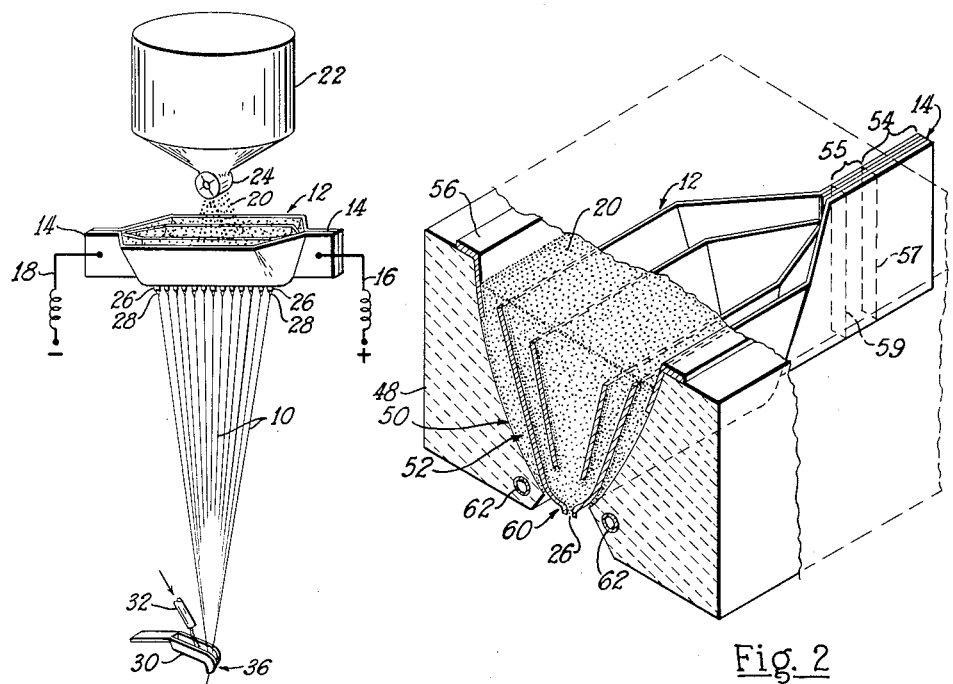
Fig. 2
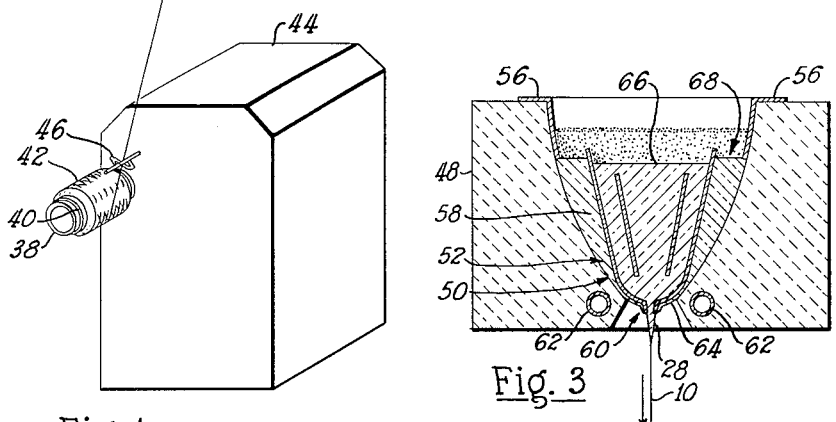
Fig. 1
Fig. 3
INVENTOR.
CHARLES J. STALEGO
BY
ATTORNEYS

United States Patent Office 3,198,615
Patented Aug. 3, 1965

3,198,615
METHOD AND APPARATUS FOR MELTING HEAT-SOFTENABLE MATERIALS
Charles J. Stalego, Newark, Ohio, assignor to Owens-Corning Fiberglas Corporation, a corporation of Delaware
Filed Aug. 11, 1961, Ser. No. 130,935
8 Claims. (Cl. 65—2)

This invention relates to the production of molten glass and more particularly to a method and apparatus for producing high temperature glass fibers from high melting glasses employing glass feeders or bushings of oxidizable refractory metals.

In the production of glass fibers of the continuous type, it has been found to be substantially essential to employ molten glass feeders or bushings made of precious metals such as platinum. Refractory materials such as clay, clay-based bricks and the like are subject to erosion by molten glass and release infusible particles into the melt. Since continuous fibers are produced by rapidly attenuating or drawing out small streams of molten glass to a very small diameter on the order of a few microns, the slightest foreign particles may interrupt the process by causing a break in the fiber. Interruption of the process result in time-consuming and expensive loss of product; and substantially continuous attenuation is required for profitable operation.

Accordingly, bushings or feeders for producing glass fibers of the continuous type have generally been fabricated of platinum or platinum alloyed with small amounts of iridium. While platinum has proven satisfactory for making feeders, its melting point of 3192° F. has placed a rather severe upper limit of about 2200° F. on the softening point of fibers which can be produced by its use. The fiber softening point must be maintained sufficiently below the melting point of the bushing to prevent destruction thereof by melting.

Accordingly, it is an important object of the present invention to provide a method for melting high temperature glasses utilizing oxidizable refractory metals.

A further object is to provide a method for producing high temperature continuous glass fibers utilizing a bushing made of oxidizable refractory metal.

A still further object is to provide a method for melting high temperature glasses utilizing a melter made of oxidation prone refractory metal, wherein the glass batch and/or the molten glass produced by the melter are utilized to provide an oxygen-excluding protective coating for both the interior and exterior surfaces of the melter to prevent oxidation thereof.

A further specific object is to provide a method for producing high temperature continuous glass fibers utilizing a fiber forming bushing made of oxidation-prone refractory metal wherein the glass batch and/or the glass melted by the bushing are utilized to provide an oxygen-excluding protective coating for both the interior and exterior surfaces of the bushing to prevent oxidation.

A further object is to provide apparatus for melting high temperature glasses including an electrically heated melter made of oxidation-prone refractory metal that is prevented from oxidizing by powdered glass-forming materials placed therein and by molten glass produced thereby.

Another object is to provide apparatus for producing high temperature continuous glass fibers including an electrically heated fiber-forming bushing cradled within a refractory support and prevented from oxidizing by glass or glass forming materials covering the interior and exterior surfaces of the bushing in oxygen-excluding relation.

In the drawings:
FIGURE 1 is an isometric view of apparatus used for the production of continuous glass fibers;
FIGURE 2 is an isometric section view, partially in phantom, illustrating the manner in which a fiber-forming bushing made of oxidizable refractory metal is mounted for use out of contact with atmospheric gases in accordance with the present invention; and
FIGURE 3 is a section view showing the manner in which powdered glass-forming materials and molten glass surround the fiber-forming bushing made of oxidizable refractory metal to protect it from oxidation in accordance with the invention.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

*Brief perspective*

Briefly the present invention relates to a method and apparatus for melting high temperature glasses and forming high temperature glass fibers wherein a high temperature resistant but readily oxidizable refractory metal melter or feeder is utilized to provide melting temperatures substantially higher than those capable of being produced by the temperature and oxidation-resistant precious metal melters and feeders of the present and prior art. This novel effect is produced in accordance with the present invention by operating the melter in a unique manner in an oxygen-excluding atmosphere. Thus the melter is operated while substantially filled or overfilled with molten glass to thereby coat the interior surfaces with an oxygen-excluding film of molten glass and prevent oxidation.

Also, the exterior surfaces of the melter are protected from oxidation by a film of oxygen-excluding glass retained around the exterior surfaces by supporting the melter in spaced relation within a refractory casing so that the heat of the melter is effective to convert powdered glass-forming materials placed in the space to molten glass. Further, means is provided for stabilizing the outer layer of glass around the melter, and in the case of a fiber-forming bushing, around the exterior surfaces of the glass-feeding orifices formed in the base thereof.

*The environment*

As shown in FIGURE 1, continuous glass fibers 10 are formed in accordance with the present invention utilizing a bushing 12 made of oxidation-prone refractory metal. The bushing 12 is provided with electrical terminals 14, at each end, to which electric lines 16 and 18 are connected whereby electric current is passed through the bushing to heat the same by its own resistance. Powdered glass-forming materials 20 are fed into the bushing 12 at a continuous rate from a hopper 22 by a feeder 24.

In the bushing 12, the materials 20 are converted into molten glass which exudes downwardly from apertures 26, formed in aligned array along the bottom of the bushing, as small molten streams 28. The streams 28 are attenuated into the fibers 10 which are passed over a gathering pad 30, lubricated by a liquid binder and sizing applicator 32.

The fibers are gathered into a strand 34 at a point 36 on the lubricated pad 30 and the strand passes downwardly to a rapidly rotated collet 38. The collet 38 carries a tube 40 upon which the strand 34 is wound to form a package 42. The collet is rotated by a motor (not shown) that is contained within the cabinet 44. Rotation of the collet 38 and the winding of the strand 34 on the tube 40 carried thereby provides the attenuation force for drawing out the small molten streams 28 into the fibers 10. As the strand 34 is wound, it is traversed to and fro across the surface of the tube 40 by a traversing mechanism 46 to provide point contact between successive turns of the strand and thereby prevent sticking when the binder and size dry.

The method and apparatus of invention

It is important, in accordance with the present invention that the bushing, which is made of high temperature resistant, but readily oxidizable refractory metal, be operated in an oxygen-free environment. This is accomplished in a unique manner by coating substantially all surfaces of the refractory metal of the bushing, particularly in the high temperature glass melting zone with an oxygen-excluding coating or film of glass or glass batch. Small portions of the terminals of the bushing are protected against oxidation by a surrounding refractory support and the exposed portions of the terminals for passage of electrical current are protected from oxidation by terminal clamps which are cooled and are therefore effective to cool the exposed portions of the terminals below the oxidation threshold.

Accordingly, a support 48, made of refractory, is provided which defines a generally U-shaped channel 50. The bushing 12 is supported within the U-shaped channel 50 with a small space 52 between the inside wall of the channel and the exterior of the bushing. As shown in FIGURE 2, the refractory supports 48 completely surround the bushing 12 except for a short portion 54 of the terminal 14 which is exposed for connecting a terminal clamp to provide electric current in accordance with the illustration of FIGURE 1. The portion 55 of the terminal, between the refractory limits 57 and 59, is encased within refractory.

The refractory support 48 extends above the top of the bushing 12 and is clad with stainless steel or platinum or other high temperature and oxidation and corrosion resistant metal as at 56, from a point slightly below the top of the bushing up and overlapping the top of the refractory support. The purpose of this cladding is to prevent the refractory from spalling or flaking off and contaminating the materials melted within the bushing 12 with small infusible particles, which would interrupt the attenuation process, as previously mentioned.

The reason why the metal cladding 56 and the refractory support 48 extend above the bushing 12 is to permit the bushing to be entirely covered with powdered glass-forming materials, as illustrated in FIGURES 2 and 3. At the beginning of the glass melting operation, the surplus powdered material 20 also fills the space 52 between the outside of the bushing 12 and the U-shsaped channel 50 of refractory support 48.

As shown in FIGURE 3, the surrounding powdered material 20 in the space 52 melts during operation of the bushing and thus fills the space with a layer of molten glass 58, which coats substantially the entire exterior surfaces of the bushing, including substantially all of the tip section, but with the exception of the exposed portion 54 and refractory encased portion 55 of the terminals.

The molten layer 58 is prevented from leaking downwardly and being lost from the space between the refractory support 48 and the bushing 12 by cooling conduits 62, positioned within the refractory, adjacent the tip section 60. These conduits carry a cooling fluid such as water, to provide a very slight cooling action, just enough to stiffen the glass adjacent the tip section and prevent it from escaping.

At the start of the operation, the cooling conduits 62 are not operated. This permits a small amount of glass to flow out along the bottom of the bushing and cover the tip section 60 with an oxygen-excluding film 64. Then the cooling fluid is applied through the cooling conduit 62 to stiffen the glass at the bottom of the space 52 and retain it in position as an impervious, oxidation-preventing coating. The film 64 also comes partially from the tips or orifices 26 by capillary attraction of the molten glass for the hot metal of the bushing, the glass crawling out around and over the surfaces of the orifices to join with the glass initially released by inoperativeness of the cooling conduit 62.

As shown in FIGURE 3, the glass level 66 extends nearly to the top of the bushing 12, thereby coating substantially the entire interior area with protective glass, and excluding oxygen. Above the glass level 66 the bushing metal is covered with powdered glass-forming material 20, some of which is at least partially melted, and thus the upper portions of the bushing are protected from oxidation. Thus, with the films of glass 58 and 64 coating the exterior of the bushing, a coating of molten glass, partially melted powdered glass-forming material or powdered material surrounds the entire surface area of the bushing, except for portions of the terminals which are surrounded by refractory and by a cooled terminal clamp.

As previously mentioned, the short portion 54 of the terminal 14 is exposed for connecting a terminal clamp, which is conventionally fabricated of copper or copper alloy to provide high electrical conductivity. Since this metal is of comparatively low melting point, cooling conduits are provided within the clamp so that a suitable cooling fluid such as water can be passed through the clamp to prevent melting by the extremely high temperatures generated within the bushing. Since the fluid cooling is effective to retain the terminal well below the oxidation threshold, oxidation of the exposed portion of the bushing is thereby prevented to provide a unit of long life.

Charging the melter

Although not illustrated in the drawings, it is to be considered within the scope of the invention to feed glass marbles or small glass pellets to the bushing for melting therein instead of either powdered batch material or powdered glass. When so operating, the glass level is maintained at the very top of the bushing in a slightly over full condition whereby the bushing is entirely submerged in molten glass. As regards this aspect, molten blobs of glass also can be dropped into the bushing at periodic intervals, synchronized with the rate of withdrawal of glass, to maintain the bushing in slightly over full condition. Also, one or more streams of molten glass can be fed into the bushing at a controlled rate to provide a slightly over full condition.

Thermal isolation of the bushing

The top edge of the bushing 12 is spaced a sufficient distance away from the stainless steel or platinum cladding 56 as at 68 to provide a sufficient temperature gradient between the bushing and the cladding to prevent melting of the latter material. This is necessary since the temperature of operation of the refractory metal bushing 12 will generally be substantially higher than the melting point of the cladding.

Materials of construction

The metals particularly contemplated for use in producing glass in accordance with the present invention include tungsten, molybdenum, tantalum and alloys thereof. Tungsten has a melting point of 6200° F. and molybdenum and tantalum each have melting points of about 5500° F. Thus it is within the scope of the present invention to utilize these metals for producing high melting glasses as for example in the temperature range of 1200° F. to 4500° F., thus allowing a safe margin to prevent destruction of the bushings by melting. In some instances, by exercising a sufficient degree of caution, temperatures above this level can be approached for producing glasses and fibers of even higher melting points.

In addition to the pure metals, alloys of these materials can be used as follows:

| | Melting temperature degrees F. |
|---|---|
| Tungsten and molybdenum all proportions | 5500°–6200° |
| Tungsten and tantalum all proportions | 5500°–6200° |
| Molybdenum and tantalum all proportions | 5500° |

Although the invention has been described with particular emphasis on the oxidizable refractory metals, it is to be considered within the broadened scope of the invention to fabricate the melter of metals of lower melting points which are also oxidation-prone and accordingly require protection for operation at elevated temperatures. When so operating, glasses having softening temperatures compatible with the metals employed will be used.

Although not shown in the drawings, it is to be included within the scope of the invention to provide holes in the sides of the melters. Thus, the heat from the melter will melt the surrounding batch and it will flow into the interior of the melter. When the melter takes the form of a fiber-forming bushing, the space between the bushing and the refractory support is enlarged to permit particles that may spall from the refractory to settle to the bottom of the space and not be carried into the bushing and interrupt fiber formation.

In accordance with this optional feature of the invention, the holes preferably would be placed near the top of the bushing to give optimum settling space for longer life.

Thus, according to this aspect of the invention, the sides of the melter and/or bushing would in effect function as heater strips to provide highly efficient melting, with the surrounding batch materials functioning as an excellent insulating material to reduce heat losses.

*Summary and advantages*

The present invention thus provides a method and apparatus for producing high melting glasses and fibers from such glasses that have substantially higher softening points than those now capable of being produced by melters and bushings made of platinum and platinum-iridium alloys. In the past, an upper level of about 2200° F. has been imposed by the metals used. However, by the present invention, fibers having softening points extending upwardly to the range of about 4500° F. can be produced. Generally, it can be stated that these higher melting glasses contain as principal ingredients, such high melting materials as zirconia ($ZrO_2$) and thoria ($ThO_2$).

The extended scope of the invention will include the melting of glass using oxidation-prone metals as the melting structure wherein the melter is surrounded by an oxygen-excluding coating of molten glass or powdered glass-forming materials.

Several advantages arise from the present invention including the fact that a method and apparatus are provided for melting glass wherein melting efficiencies are very high. Thus, the powdered glass materials and molten glass surrounding the bushing, along with the supporting refractory provide excellent insulation for retention of heat in the glass melting zone.

Also, the present invention is unique in eliminating the need for expensive inert or reducing gas atmosphere.

Further, an oxygen-excluding film of glass is utilized to protect the tip section of a fiber-forming bushing and prevent oxidation to a more highly effective degree than inert or reducing gas.

I claim.

1. In apparatus for forming glass fibers, an electrically heated bushing of oxidizable refractory metal having a bottom, a top and electrical terminals at the ends, at least one feed orifice for molten glass in said bottom, a refractory support cradling said bushing in spaced relation and having an opening through which said glass feed orifice is exposed, said support extending above said top of said bushing and having an oxidation resistant metal cladding covering portions above said top of said bushing, said support encasing portions of said terminals adjacent said bushing, and portions of said terminals remote from said bushing being exposed for connection with a source of electrical current, and cooling means in said refractory support adjacent said feed orifice whereby glass-forming materials placed in said bushing and said support in surrounding relation to said bushing are melted by said bushing to fill said space beween said bushing and said refractory support with molten glass and flow over said orifice to be stabilized by said cooling means and retained in oxygen-excluding relation to the exterior surfaces of said bushing.

2. In apparatus for forming glass fibers, an electrically heated fiber forming bushing of oxidizable refractory metal, said bushing having a bottom, a top and ends with electrical terminals extending axially from said ends, at least one feed orifice for molten glass in said bottom, a refractory casing supporting said bushing in spaced relationship and encasing portions of said terminals adjacent said ends, leaving portions of said terminals remote from said ends exposed for connection with a source of electrical current, said refractory casing extending above said top of said bushing and having an oxidation-resistant metal cladding covering portions above said top of said bushing, said casing having an opening through which said feed orifice is exposed, cooling conduits in said refractory adjacent said feed orifice, and molten glass substantially filling said bushing and said space between said bushing and said refractory support and being retained in said space by stabilization from said cooling conduits and coating the exterior surfaces of said feed orifice by capillary attraction of the hot glass for the hot metal, and powdered glass-forming materials filling the space above said bushing surrounded by said metal cladding.

3. In a method of melting glass with a heated melter having a feed orifice for molten glass, and the melter being cradled in spaced relation within a heat-resistant support, the steps of filling the melter and the space between the melter and the support with molten glass to submerge the melter, stabilizing the molten glass in said space in surrounding relation to the melter to cover the exposed surfaces of the melter, and operating the melter by withdrawing molten glass from said feed orifice, while retaining the melter in the submerged condition to prevent oxidation thereof.

4. In a method of forming glass fibers with a heated melter formed of oxidizable refractory metal and having a feed orifice for molten glass in the lower portion thereof, the steps of immersing the melter in molten glass to coat all exposed surfaces with a film of glass, stabilizing the film to hold it in covering relation to the exposed surfaces and prevent oxidation of the melter, exuding a stream of molten glass through said feed orifice, and attenuating said stream into a fiber.

5. In a method of processing a heat-softenable material with a heated melter having a feed orifice in the lower portion, and said melter being cradled in spaced relation within a heat-resistant support with the feed orifice exposed to the ambient atmosphere through an opening in the support, the steps of filling the melter and the space between the melter and the support with molten material to submerge the melter, flowing molten material from the space between the melter and said heat-resistant support over the exposed exterior of the feed orifice, stabilizing the molten material in the lower portion of said space to retain the remaining molten material in said space in surrounding, covering relationship to the melter to prevent contact between the melter and the surrounding air and protect the melter against oxidation, and operating the melter in a constantly full condition to prevent internal oxidation while withdrawing molten material from the orifice.

6. In a method of processing heat-softenable material with a heated melter made of oxidizable metal and having walls for retaining molten material, and a feed orifice, the steps of coating all exposed surfaces of said walls and said feed orifice of the melter with an oxygen-excluding film of the material, and melting additional material within the melter as material is fed from said orifice while maintaining the melter in said coated condition to prevent contact between the melter and the surrounding air, thereby preventing oxidation of the melter.

7. In apparatus for processing heat-softenable material, an electrically heated melter having a feed orifice in the lower portion thereof, a refractory support cradling said melter in spaced relation, and having an opening through which said feed orifice is exposed, said support extending above said melter, means for feeding heat-softenable material into said melter and into the space between said melter and said support to be melted by said melter, and cooling means in said refractory adjacent said feed orifice whereby material melted in the space between said melter and said support and flowed over the exterior of said orifice is stabilized in oxygen-excluding relation to all exposed exterior surfaces of said melter to prevent oxidation of the melter during operation thereof.

8. In a system for melting and delivering heat-softenable material, a melter having a feed orifice in the lower portion thereof, a heat-resistant support cradling said melter in spaced relation, with the feed orifice exposed downwardly, heat-softenable material filling the space surrounding the melter and covering the exposed exterior surfaces thereof and of the feed orifice, and means stabilizing the heat-softenable material in said space and on the exposed surfaces of the feed orifice, to cover the melter and feed orifice and prevent air from contacting and oxidizing the melter and feed orifice.

References Cited by the Examiner

UNITED STATES PATENTS

| | | | |
|---|---|---|---|
| 2,165,318 | 7/39 | Thomas et al. | 65—356 XR |
| 2,212,528 | 8/40 | Slayter | 65—135 |
| 2,225,667 | 12/40 | Staelin | 65—12 |
| 2,398,952 | 4/46 | Nachod | 65—327 XR |
| 2,714,622 | 8/55 | McMullen | 65—2 |
| 3,013,095 | 12/61 | Russell | 65—4 |
| 3,013,096 | 12/61 | Glaser | 65—4 |

DONALL H. SYLVESTER, *Primary Examiner.*

WILLIAM J. STEPHENSON, *Examiner.*